US010498164B2

(12) United States Patent
Wang et al.

(10) Patent No.: US 10,498,164 B2
(45) Date of Patent: Dec. 3, 2019

(54) WIRELESS CHARGING DEVICE

(71) Applicant: Terawins, Inc., Zhonghe, Taipei County (TW)

(72) Inventors: Yu Kuang Wang, Zhonghe (TW); Wen Yi Huang, Zhonghe (TW); Pei-Kai Hsu, Zhonghe (TW); Yung-Hsiang Lin, Zhonghe (TW)

(73) Assignee: TERAWINS, INC., Zhonghe, Taipei County (TW)

( * ) Notice: Subject to any disclaimer, the term of this patent is extended or adjusted under 35 U.S.C. 154(b) by 16 days.

(21) Appl. No.: 15/949,477

(22) Filed: Apr. 10, 2018

(65) Prior Publication Data
US 2019/0190300 A1 Jun. 20, 2019

(30) Foreign Application Priority Data

Dec. 20, 2017 (TW) .............................. 106218889 U

(51) Int. Cl.
- H02J 7/00 (2006.01)
- H02J 7/02 (2016.01)
- H01F 27/36 (2006.01)
- H01F 27/28 (2006.01)
- H01F 38/14 (2006.01)

(52) U.S. Cl.
CPC ........... *H02J 7/025* (2013.01); *H01F 27/2885* (2013.01); *H01F 27/365* (2013.01); *H01F 38/14* (2013.01)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| 2010/0219697 A1* | 9/2010 | Azancot | H01F 38/14 |
| | | | 307/104 |
| 2015/0326055 A1* | 11/2015 | Koyanagi | H04B 5/0037 |
| | | | 455/573 |
| 2018/0026482 A1* | 1/2018 | Asano | H02J 7/00 |
| | | | 307/104 |

* cited by examiner

*Primary Examiner* — Arun C Williams
(74) *Attorney, Agent, or Firm* — Muncy, Geissler, Olds & Lowe, P.C.

(57) ABSTRACT

A wireless charging device is provided, including an accommodating space, a first coil, a second coil, and a control module. The first coil surrounds the accommodating space, and the second coil is disposed in the accommodating space. The control module is electrically connected to the first coil and the second coil.

9 Claims, 2 Drawing Sheets

WIRELESS CHARGING DEVICE

CROSS REFERENCE TO RELATED APPLICATIONS

The present application is based on, and claims priority from, Taiwan Patent Application No. 106218889, filed on Dec. 20, 2017, the disclosure of which is hereby incorporated by reference herein in its entirety.

BACKGROUND OF THE INVENTION

Field of the Invention

The application relates in general to a wireless charging device, and in particular, to a wireless charging device for charging electronic devices having different receiving coils.

Description of the Related Art

Wireless charging is an alternating current induction technology using the electromagnetic induction principle. A coil in the wireless charging device generates an electromagnetic field that generates current within the receiving coil. That current can be converted into direct current and used to charge the electronic device.

However, when the electronic device is charged using the aforementioned method, the coil in the wireless charging device must match the receiving coil of the electronic device. In other words, the dimensions and the inductance of the coil in the wireless charging device should correspond to that of the receiving coil of the electronic device. If the coil in the wireless charging device does not match the receiving coil of the electronic device, the wireless charging device cannot charge the electronic device (for example, a wireless charging device for a common smartphone cannot charge a smartwatch). It is inconvenient for the user to have to bring a plurality of wireless charging devices. Therefore, how to address the aforementioned problem has become an important issue.

BRIEF SUMMARY OF INVENTION

To address the deficiencies of conventional products, an embodiment of the invention provides a wireless charging device, including an accommodating space, a first coil, a second coil, and a control module. The first coil surrounds the accommodating space, and the second coil is disposed in the accommodating space. The control module is electrically connected to the first coil and the second coil.

In some embodiments, the first coil and the second coil comprise annular structures, and the inner diameter of the first coil is greater than the outer diameter of the second coil.

In some embodiments, the center of the first coil is aligned with the center of the second coil.

In some embodiments, the wireless charging device further comprises a magnetic shielding member disposed between the first coil and the second coil.

In some embodiments, the magnetic shielding member surrounds the second coil.

In some embodiments, the control module comprises a power supply assembly, a main control integrated circuit, a first control circuit, and a second control circuit. The main control integrated circuit is electrically connected to the power supply assembly. The first control circuit is electrically connected to the main control integrated circuit and the first coil. The second control circuit is electrically connected to the main control integrated circuit and the second coil.

In some embodiments, when an electronic device having a receiving coil approaches the wireless charging device, the first control circuit and the second control circuit detect whether the receiving coil matches the first coil and the second coil via the first coil and second coil respectively.

In some embodiments, the control module further comprises a first switch circuit electrically connected to the first control circuit and the first coil, wherein when the receiving coil matches the second coil, the first switch circuit interrupts the electrical connection between the power supply assembly and the first coil.

In some embodiments, the control module further comprises a second switch circuit electrically connected to the second control circuit and the second coil, wherein when the receiving coil matches the first coil, the second switch circuit interrupts the electrical connection between the power supply assembly and the second coil.

In some embodiments, the wireless charging device further comprises a magnetic shielding sheet, and the first coil and the second coil are disposed on the magnetic shielding sheet.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The embodiments of the wireless charging device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
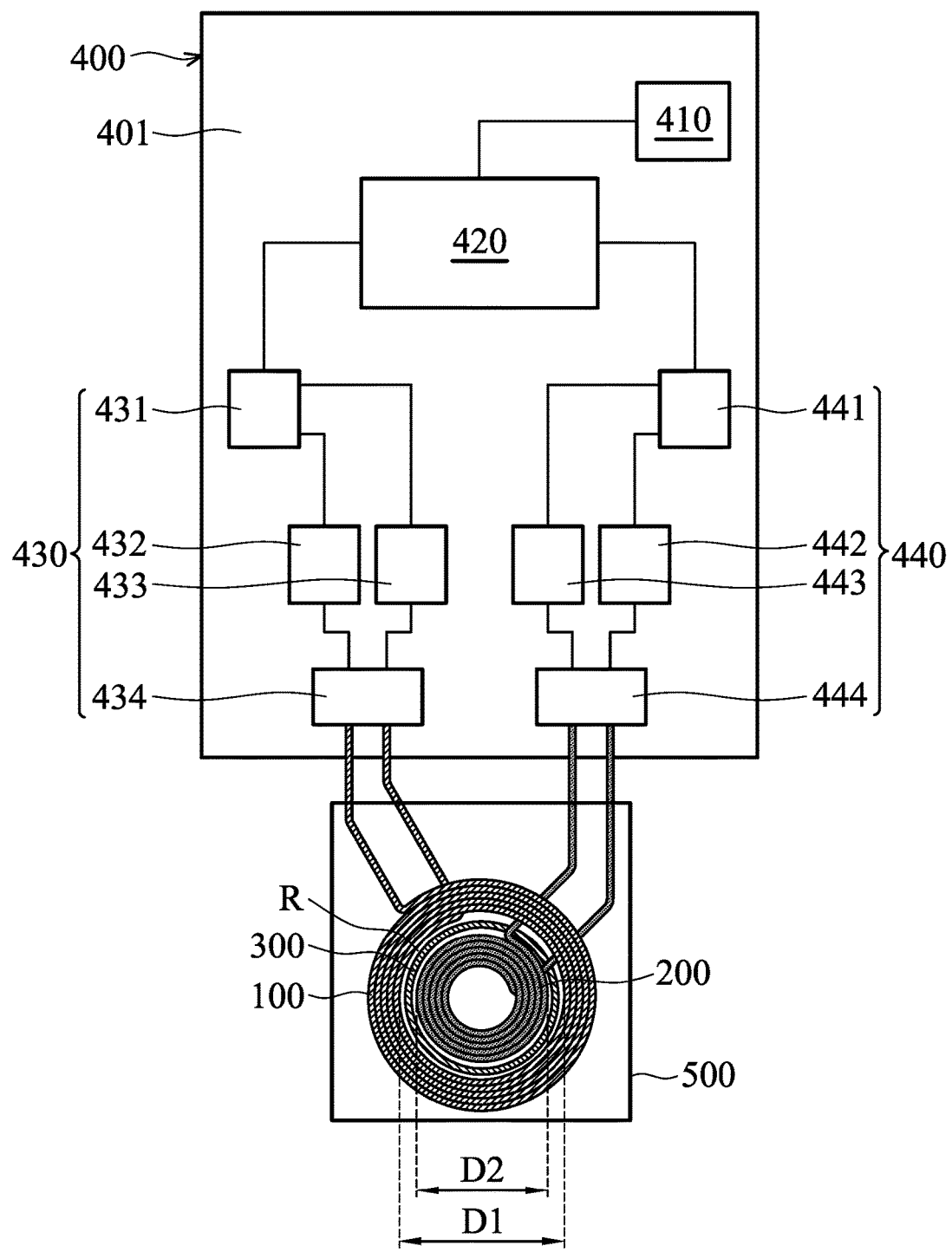
FIG. 1 is a schematic diagram of a wireless charging device according to an embodiment of the invention.

FIG. 1 is a schematic diagram of a wireless charging device according to an embodiment of the invention. The wireless charging device can charge various electronic devices (such as a smartphone or a smartwatch) in a wireless manner, and these electronic devices can comprise receiving coils having different dimensions and inductances. As shown in FIG. 1, the wireless charging device primarily comprises a first coil 100, a second coil 200, a magnetic shielding member 300, and a control module 400.

The first coil 100 has an annular structure. An accommodating space R can be formed at the center of the annular structure and surrounded by the first coil 100. The second coil 200 and the magnetic shielding member 300 can be disposed in the accommodating space R, and the magnetic shielding member 300 is disposed between the first coil 100 and the second coil 200. In this embodiment, the second coil 200 and the magnetic shielding member 300 also comprise annular structures, and the magnetic shielding member 300 surrounds the second coil 200.

The electromagnetic interference (EMI) between the first coil 100 and the second coil 200 can be prevented by the magnetic shielding member 300. The magnetic shielding member 300 can comprise iron, aluminum, or other suitable metal, for example. In some embodiments, the magnetic shielding member 300 has a plurality of segments separated from each other, so as to correspond to the line arrangement of the wireless charging device.

The first coil 100 and the second coil 200 are substantially arranged on the same horizontal surface. In particular, the inner diameter D1 of the first coil 100 is greater than the outer diameter D2 of the second coil 200, and a gap is formed between the first coil 100 and the second coil 200. Therefore, the first coil 100 and the second coil 200 do not overlap. Furthermore, the center of the first coil 100 is aligned with the center of the second coil 200, and the distance between the first coil 100 and the second coil 200 is substantially maintained.

Since the first coil 100 has large dimensions, the receiving coil in the smartphone or the tablet computer can match the first coil 100. The wireless charging device can charge the aforementioned electronic device. In contrast, since the second coil 200 has small dimensions, the receiving coil in the smartwatch or the smart ring can match the second coil 200. The wireless charging device can also charge the aforementioned electronic device. For example, the first coil 100 is a coil meeting the requirements of Wireless Power Consortium (WPC) A11. Thus, the wireless charging device of the present application is improved over the conventional charging system. An electronic device having a small receiving coil can be charged using the same wireless charging device, and the volume of the wireless charging device is not increased compared to the conventional one.

Referring to FIG. 1, the control module 400 comprises a power supply assembly 410, a main control integrated circuit 420, a first control unit 430, and a second control unit 440. The power supply assembly 410 is electrically connected to the main control integrated circuit 420, and the main control integrated circuit 420 is electrically connected to the first coil 100 and the second coil 200 via the first control unit 430 and the second control unit 440 respectively.

The first control unit 430 comprises a first demodulation circuit 431, a plurality of first control circuits 432 and 433, and a first switch circuit 434. The first demodulation circuit 431 is disposed between the main control integrated circuit 420 and the first control circuits 432 and 433, and electrically connected thereto. The first control circuits 432 and 433 are disposed between the first demodulation circuit 431 and the first switch circuit 434, and electrically connected thereto. The first switch circuit 434 is disposed between the first control circuits 432 and 433 and the first coil 100, and electrically connected thereto.

Similarly, the second control unit 440 comprises a second demodulation circuit 441, a plurality of second control circuits 442 and 443, and a second switch circuit 444. The second demodulation circuit 441 is disposed between the main control integrated circuit 420 and the second control circuits 442 and 443, and electrically connected thereto. The second control circuits 442 and 443 are disposed between the second demodulation circuit 441 and the second switch circuit 444, and electrically connected thereto. The second switch circuit 444 is disposed between the second control circuits 442 and 443 and the second coil 200, and electrically connected thereto.

The operation method of the wireless charging device according to an embodiment of the present application is discussed below. When an electronic device, which can be charged in a wireless manner, approaches the wireless charging device, the first control circuits 432 and 433 and the second control circuits 442 and 443 can detect whether the receiving coil in the electronic device matches the first coil 100 and the second coil 200 via the first coil 100 and second coil 200 respectively, and respectively transmit signal to the first and second demodulation circuits 431 and 441. These signals can be demodulated by the first and second demodulation circuits 431 and 441 and transmit to the main control integrated circuit 420. The main control integrated circuit 420 can control the first switch circuit 434 and the second switch circuit 444 according to the received information.

In particular, when the receiving coil in the electronic device matches the first coil 100, the main control integrated circuit 420 can control the second switch circuit 444 to interrupt the electrical connection between the second coil 200 and the power supply assembly 410, and the power supply assembly 410 can provide power to the first coil 100. The inductive coupling can be generated between the first coil 100 and the receiving coil in the electronic device, so as to charge the electronic device.

When the receiving coil in the electronic device matches the second coil 200, the main control integrated circuit 420 can control the first switch circuit 434 to interrupt the electrical connection between the first coil 100 and the power supply assembly 410, and the power supply assembly 410 can provide power to the second coil 200. The inductive coupling can be generated between the second coil 200 and the receiving coil in the electronic device, so as to charge the electronic device.

In some embodiments, the control module 400 can further comprise at least one light-emitting diode (not shown) electrically connected to the main control integrated circuit 420. When the main control integrated circuit 420 receives information from the first and second demodulation circuits 431 and 441, it can transmit a signal to the light emitting diode. The light emitting diode can therefore emit light, and the user can note that the wireless charging device is in operation.

Figure 2:
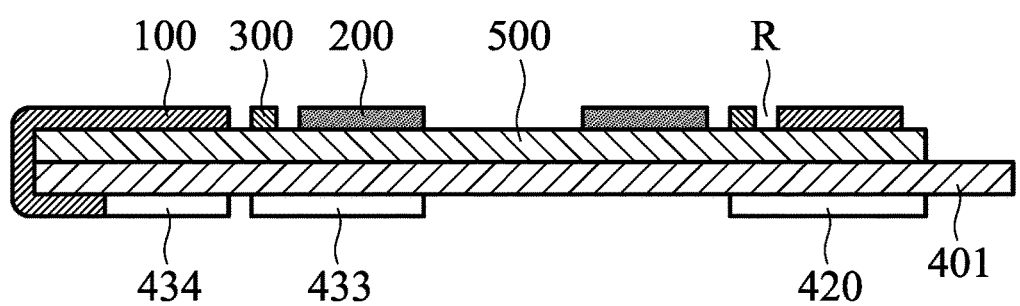
FIG. 2 is a schematic diagram of a wireless charging device according to an embodiment of the invention, wherein a magnetic shielding sheet of the wireless charging device is disposed on a circuit substrate.

Furthermore, referring to FIG. 1, in this embodiment, the control module 400 is disposed on a circuit substrate 401, and the first coil 100, the second coil 200, and the magnetic shielding member 300 of the wireless charging device are disposed on a magnetic shielding sheet 500. The appearance of the wireless charging device can be adjusted as required by changing the relative position between the circuit substrate 401 and the magnetic shielding sheet 500. For example, as shown in FIG. 2, the magnetic shielding sheet 500 can be disposed on the circuit substrate 401, and positioned between the circuit substrate 401 and the first and second coils 100 and 200. Therefore, the width of the wireless charging device can be reduced.

In summary, a wireless charging device is provided, including an accommodating space, a first coil, a second coil, and a control module. The first coil surrounds the accommodating space, and the second coil is disposed in the accommodating space. The control module is electrically connected to the first coil and the second coil. The aforementioned wireless charging device can charge various electronic devices having different receiving coils, and the volume of the wireless charging device is not increased compared to the conventional one.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A wireless charging device, comprising:
    an accommodating space;
    a first coil, surrounding the accommodating space;
    a second coil, disposed in the accommodating space; and
    a control module, electrically connected to the first coil and the second coil, wherein the control module comprises:
        a power supply assembly;
        a main control integrated circuit, electrically connected to the power supply assembly;
        a first control circuit, electrically connected to the main control integrated circuit and the first coil; and
        a second control circuit, electrically connected to the main control integrated circuit and the second coil.

2. The wireless charging device as claimed in claim 1, wherein the first coil and the second coil comprise annular structures, and the inner diameter of the first coil is greater than the outer diameter of the second coil.

3. The wireless charging device as claimed in claim 2, wherein the center of the first coil is aligned with the center of the second coil.

4. The wireless charging device as claimed in claim 1, wherein the wireless charging device further comprises a magnetic shielding member disposed between the first coil and the second coil.

5. The wireless charging device as claimed in claim 4, wherein the magnetic shielding member surrounds the second coil.

6. The wireless charging device as claimed in claim 1, wherein when an electronic device having a receiving coil approaches the wireless charging device, the first control circuit and the second control circuit detect whether the receiving coil matches the first coil and the second coil via the first coil and second coil respectively.

7. The wireless charging device as claimed in claim 6, wherein the control module further comprises a first switch circuit electrically connected to the first control circuit and the first coil, wherein when the receiving coil matches the second coil, the first switch circuit interrupts the electrical connection between the power supply assembly and the first coil.

8. The wireless charging device as claimed in claim 6 wherein the control module further comprises a second switch circuit electrically connected to the second control circuit and the second coil, wherein when the receiving coil matches the first coil, the second switch circuit interrupts the electrical connection between the power supply assembly and the second coil.

9. The wireless charging device as claimed in claim 1, wherein the wireless charging device further comprises a magnetic shielding sheet, and the first coil and the second coil are disposed on the magnetic shielding sheet.

* * * * *